(12) United States Patent
Bray

(10) Patent No.: US 9,122,940 B2
(45) Date of Patent: Sep. 1, 2015

(54) BARCODE SCANNER

(75) Inventor: Michael Don Bray, Coppell, TX (US)

(73) Assignee: TNA Australia Pty Limited, Lidcombe, New South Wales (AU)

( * ) Notice: Subject to any disclaimer, the term of this patent is extended or adjusted under 35 U.S.C. 154(b) by 314 days.

(21) Appl. No.: 13/506,231

(22) Filed: Apr. 5, 2012

(65) Prior Publication Data

US 2012/0261475 A1 Oct. 18, 2012

(30) Foreign Application Priority Data

Apr. 18, 2011 (AU) ................................ 2011901455

(51) Int. Cl.
*G03B 3/10* (2006.01)
*G06K 7/10* (2006.01)
*B65B 57/08* (2006.01)
*B65B 9/20* (2012.01)

(52) U.S. Cl.
CPC .............. *G06K 7/10861* (2013.01); *B65B 9/20* (2013.01); *B65B 57/08* (2013.01); *G06K 7/1096* (2013.01); *G06K 7/10792* (2013.01)

(58) Field of Classification Search
USPC .......................... 235/462.23, 462.11, 462.43
See application file for complete search history.

(56) References Cited

U.S. PATENT DOCUMENTS

| 4,757,668 A | | 7/1988 | Klinkel et al. | |
| 5,568,715 A | * | 10/1996 | Ebel et al. | 53/54 |
| 6,820,399 B2 | * | 11/2004 | Send | 53/471 |
| 2004/0038789 A1 | * | 2/2004 | Succi et al. | 493/29 |

FOREIGN PATENT DOCUMENTS

| DE | 100 30 572 A1 | 1/2002 |
| EP | 0742171 A2 | 11/1996 |
| EP | 0 761 546 A1 | 3/1997 |
| EP | 1203718 B1 | 12/2004 |
| FR | 2565216 A1 | 12/1985 |
| JP | 2004-238142 A | 8/2004 |

OTHER PUBLICATIONS

Great Britain Search Report mailed on Aug. 6, 2012 for GB Patent Application No. GB1206300.4, 3 pages.
Search Report mailed Jun. 5, 2013 in Spanish Patent Application No. 201230563, filed Apr. 16, 2012, 6 pages.

* cited by examiner

*Primary Examiner* — Ahshik Kim
(74) *Attorney, Agent, or Firm* — Kilpatrick Townsend & Stockton LLP

(57) ABSTRACT

An assembly to deliver packaging film, having a barcode, to a packaging machine (10). Associated with the packaging machine (10) is a splicing machine (17) that joins film from rolls (14, 15) for delivery to the machine (10). A barcode scanner (19) extends transversely of the film, with the scanner (19) including a plurality of cameras (29). Once a barcode is detected, as an example ten images will be decoded and if six "readings" give the same result, then it can be assumed that the barcode has been correctly decoded.

9 Claims, 3 Drawing Sheets

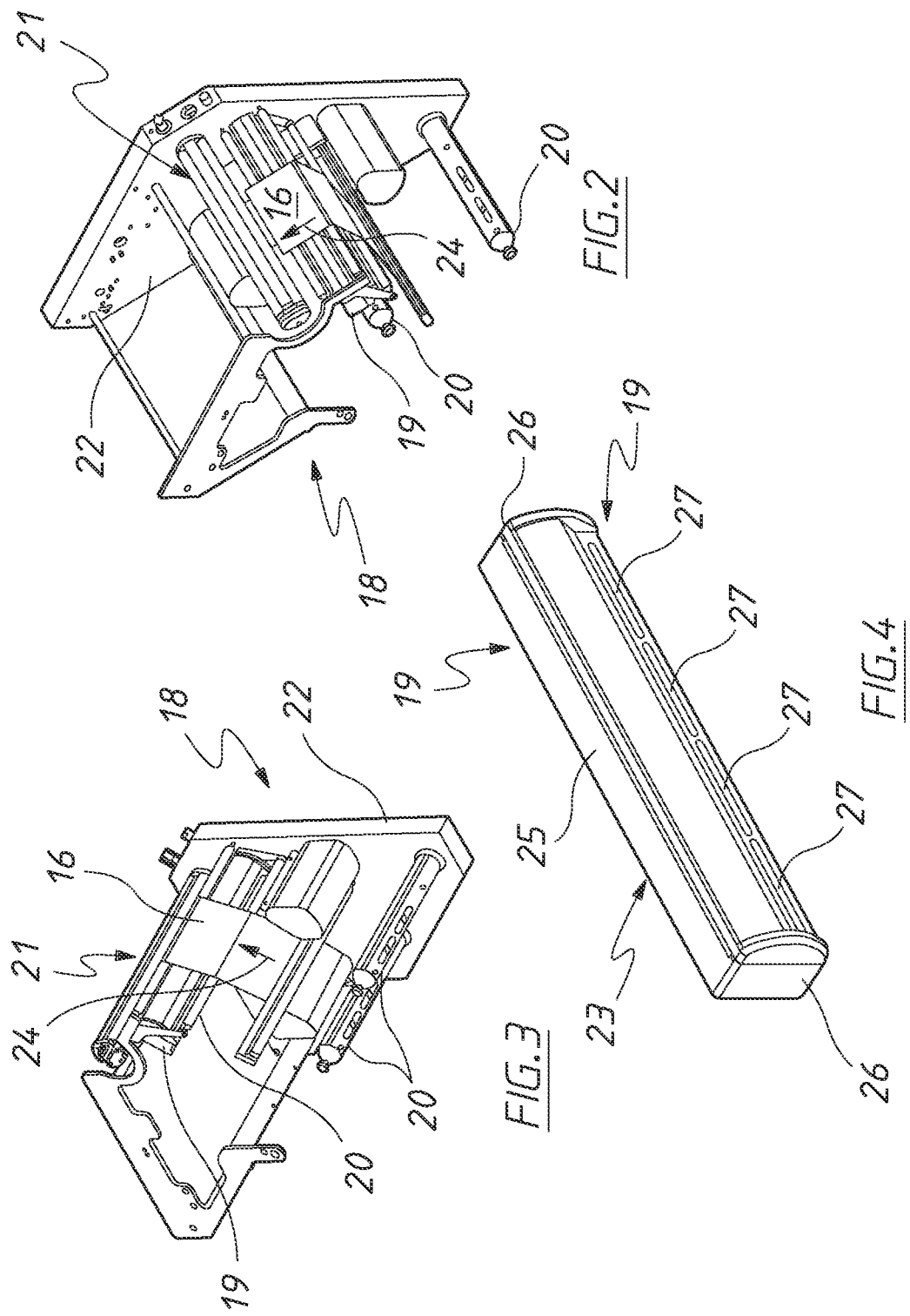

BARCODE SCANNER

CROSS-REFERENCE TO RELATED APPLICATION

This application claims the priority of Australian Patent Application No. 2011901455, filed on Apr. 18, 2011, the disclosure of which is incorporated herein by reference.

TECHNICAL FIELD

The present invention relates to barcode scanners and more particularly to barcode scanners employed in the packaging industry in which packaging film is used to form bags.

BACKGROUND OF THE INVENTION

The present invention relates to the packaging industry that employs packaging machines to which strip bag material is delivered for the purposes of manufacturing bags of product. An example of such a machine is described in U.S. Pat. No. 4,663,917.

Typically film is delivered to the packaging machine from a web storage device that stores the film and takes the film from rolls. An example of such a storage device is disclosed in U.S. Pat. No. 6,702,220.

Snack plant packaging operations are getting more complex, increasing the chance of costly mistakes being made. A flexible bag must contain the proper product (w/flavour), correct pack weight, proper date code, etc. Many times film will be similar in size and design, for example a producer may produce similar product for both Japan and Korea where the only difference is the lettering on the bag. Similar bags can also have different pack weights, different product types such as flat or ripple chips, or different flavours. In the case of allergen flavours it is particularly important to insure the correct product/flavour is in the correct bag.

Most products sold commercially in the United States and Canada is required to have a unique Universal Product Code or UPC on its package. UPC encodes 12 decimal digits. Outside the U.S. and Canada EAN codes (also known as GTIN-13) with 13 digits are used. Our scanner will read EAN/UPC codes ranging from 80% to 150% of nominal UPC size.

Firstly attempts have been made before to integrate barcode scanners into packaging systems. Typically these attempts have used off the shelf scanners, either handheld or mounted to the packaging machine. These scanners would have a limited field of view so in the case of a machine mounted unit it would have to be movable as barcodes are not always in the same place on the film. There are two concerns with this type of system; both require an operator function and secondly both can be bypassed, typically by placing a piece of film so that the scanner always reads the same barcode. Handheld scanners make it particularly easy to bypass the system, a cutout section of the film with the barcode can be taped to the side of the packaging machine and repeatedly scanned for example.

OBJECT OF THE INVENTION

It is the object of the present invention to overcome or substantially ameliorate at least one of the above disadvantages.

SUMMARY OF THE INVENTION

There is disclosed herein an assembly to deliver packaging film, having a barcode, to a packaging machine, the assembly including:

a film delivery device to pass the film along a predetermined path;

a scanner housing fixed relative to the device and exposed to said path, the housing extending transverse relative to said path; and a plurality of cameras mounted in the housing and directed at said path, each camera having a charged coupling device to provide a signal indicative of a barcode exposed to one or more of the cameras, with the cameras located at different locations across said path.

Preferably, the cameras are co-ordinated to read as a single camera.

Preferably, said housing is elongated, with said housing including at least three of said cameras mounted therein, with the cameras arranged in a linear manner.

Preferably, said assembly includes a film storage device that receives the film and directs the film along said path.

There is further disclosed herein in combination, a packaging machine to receive the film, the film passing along said path from said film storage device to said packaging machine with the scanner housing located between the film storage device and the packaging machine.

BRIEF DESCRIPTION OF THE DRAWINGS

A preferred form of the present invention will now be described by way of example with reference to the accompanying drawings wherein:

FIG. 2 is a schematic isometric view of a film storage device;

FIG. 3 is a further schematic isometric view of the device of FIG. 1; and

FIG. 4 is a schematic isometric view of a barcode scanner employed in the device of FIGS. 2 and 3.

DETAILED DESCRIPTION OF THE PREFERRED EMBODIMENT

Figure 1:
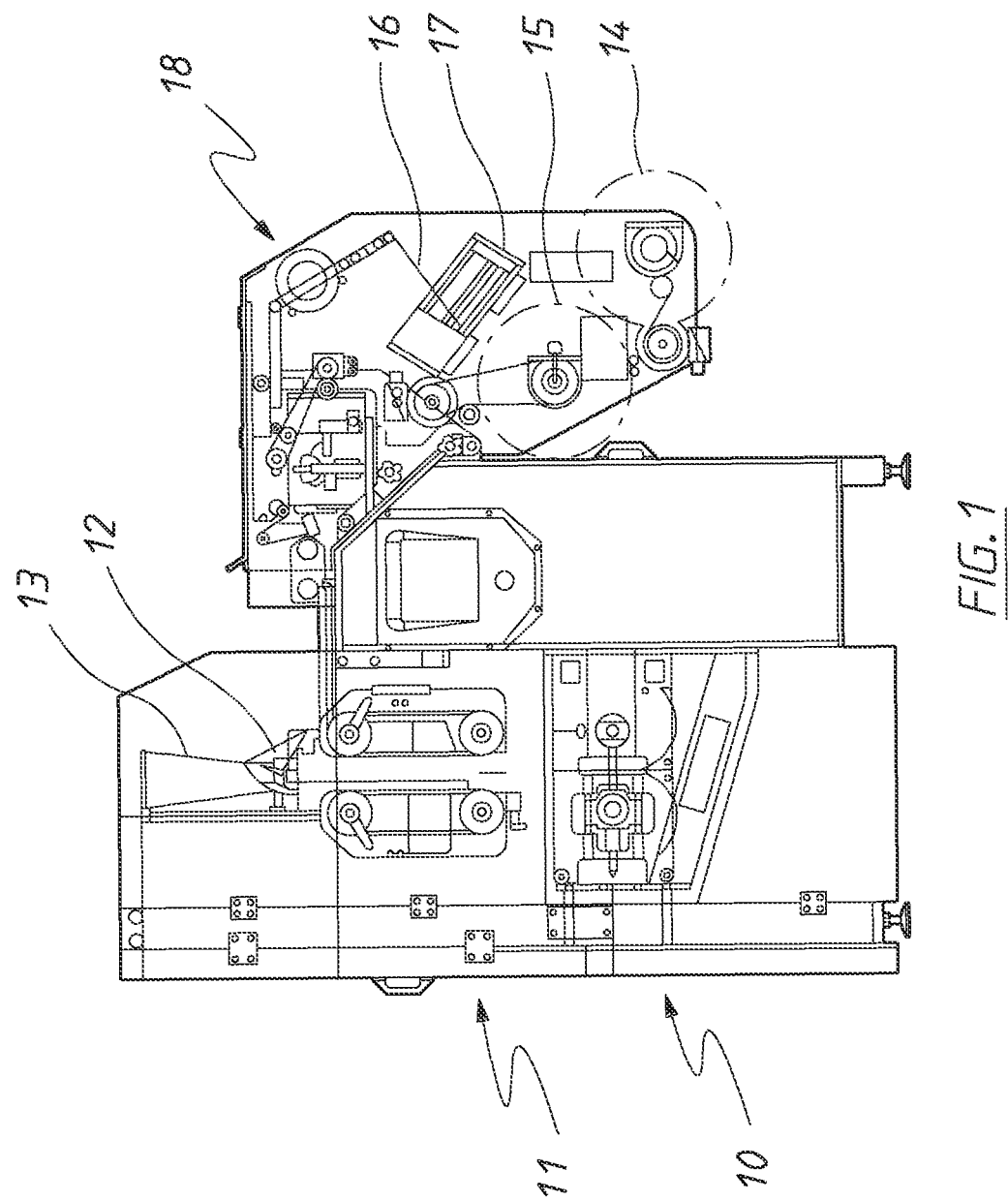
FIG. 1 is a schematic side elevation of a film storage device and packaging machine (drawing taken from FIG. 1 of U.S. Pat. No. 6,702,220)
Figure 5:
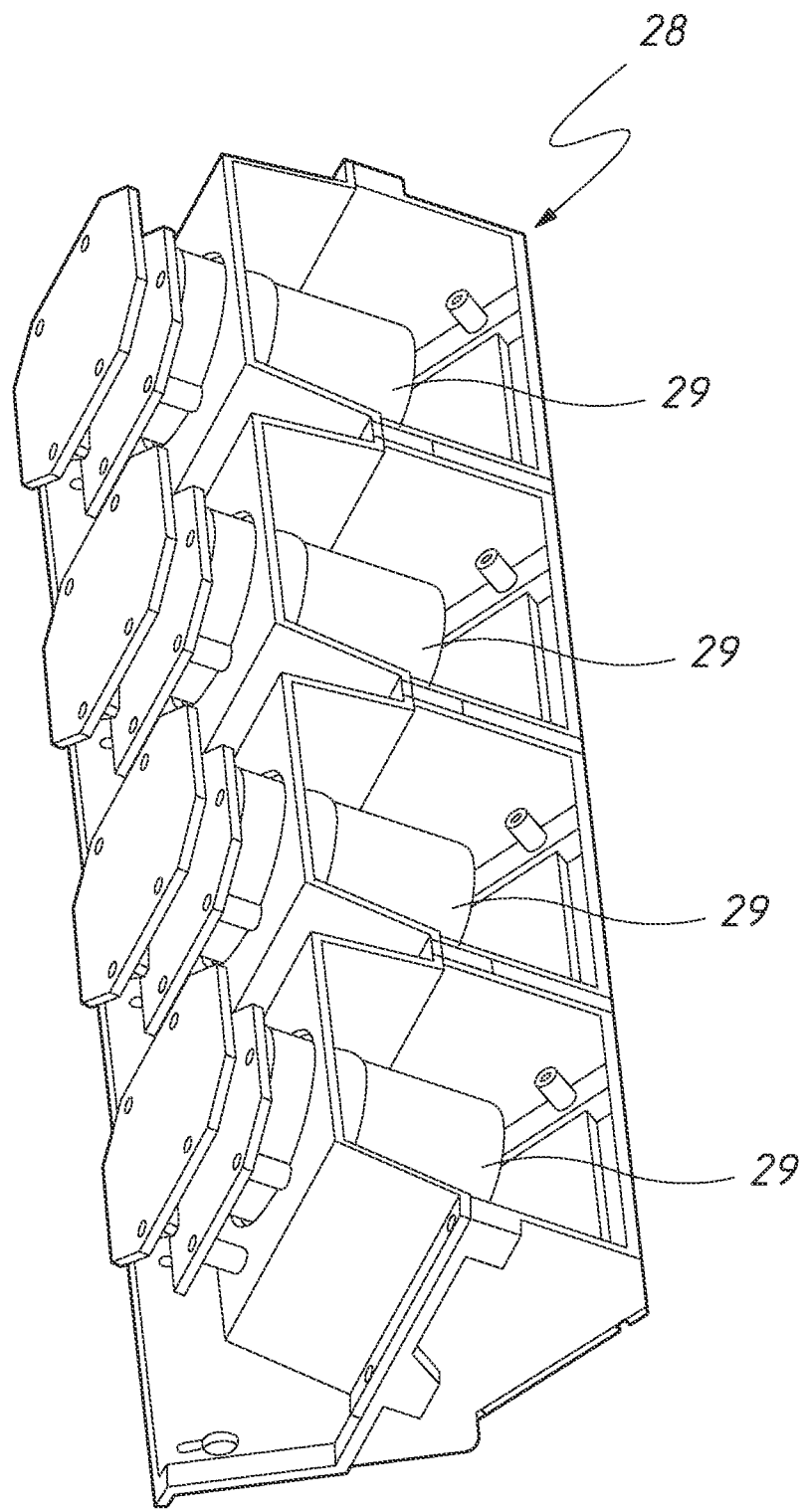
FIG. 5 is a schematic isometric view of the cameras and frame located internally of the barcode scanner of FIG. 4.

In FIG. 1 of the accompanying drawings there is schematically depicted a packaging machine 10. The packaging machine 10 may be a packaging machine as described in U.S. Pat. No. 4,663,917.

Operatively associated with the machine 10 is a film drive unit 11 above which there is positioned a former 12 and a product delivery chute 13. Examples of film drive units are disclosed in U.S. Pat. Nos. 4,910,943 and 7,472,528. The packaging film 16 (web) is provided by rolls 14 and 15, with the film 16 being delivered to the former 12 to be arranged in tubular form. Product is delivered to the chute 13 for delivery to the interior of the tubular bag material, with the tubular bag material then being longitudinally sealed, with the sealed tubular material then being delivered to the packaging machine 10. The machine 10 transversely seals and cuts the tubular bag material to form individual bags of product.

As one of the rolls 14 or 15 runs out of film 16, the trailing end is then attached to the leading end of the other roll 14 or 15. This operation is carried out by the splicing machine 17. The splicing machine 17 is fully described in U.S. Pat. No. 7,383,867.

From the splicing machine 17, the web 16 passes through a film storage device 18. An example of a film storage device 18 is fully described in U.S. Pat. No. 6,702,220.

From the film storage device 18, the film 16 is delivered to the former 12.

The film storage device 18 of this embodiment is more fully depicted in FIGS. 2 and 3. In this embodiment there is provided, in combination with the film storage device 18, a barcode scanner 19.

The film storage device 18 of this embodiment includes a pair of shafts 20 that receive the rolls 14 and 15. The film 16 passes along a predetermined path so as to pass about a roller 20 for delivery to a carriage 21 which provides for storage of the film 16 as described in U.S. Pat. No. 6,702,220.

The film storage device 18 has an end frame 22 that also supports the barcode scanner 19. The barcode scanner 19 includes a hollow housing 23 that extends transverse of the predetermined path along which the film 16 passes, and therefore extends transverse of the film 16 as the film 16 progresses in the direction 24.

The housing 23 includes a hollow body 25 with end caps 26 enclosing a space within which a plurality of cameras is located. In this embodiment there are four cameras, each camera facing a slot 27. Each camera has a charged coupled device that produces a signal indicative of any barcode detected. To aid in the barcode detection, preferably LED lighting illuminates the film 16 adjacent the barcode scanner 19.

Preferably, the cameras capture approximately 100 to 300 images per second. Once a barcode is detected, as an example ten images will be decoded and if six "readings" give the same result, then it can be assumed the barcode has been correctly decoded and the results sent to the computer of the packaging machine 10. If however a predetermined number of the decoded images do not read the same, then the machine 10 will cease operation.

As is best seen in FIGS. 2 and 3, the barcode scanner 19 extends the full width of the carriage 21 and therefore can be used to scan film 16 from very narrow widths, to a width corresponding to the longitudinal length of the carriage 21. By scanning the entire width of the film 16 every barcode printed on the film 16 will be automatically scanned, regardless where it is printed on the film 16. This addresses issues in respect of bypassing scanning of any barcode.

Located in the housing 23 is a frame 28 that supports a plurality of cameras 29. The cameras 29 are arranged in a linear array. Preferably, the cameras are co-ordinated to read as a single camera.

A further advantage of the above described preferred embodiment is that the machine 10 can be programmed to accept film having a particular barcode. If that barcode is not detected by the barcode detector 19, then the machine again can be halted.

The invention claimed is:

1. An assembly to deliver packaging film, having a barcode, to a packaging machine, the assembly including:
    a film delivery device to pass the film along a predetermined path;
    a scanner housing fixed relative to the device and exposed to said path, the housing extending transverse relative to said path; and
    a plurality of cameras mounted in the housing and directed at said path, each camera having a charged coupling device to provide a signal indicative of a barcode exposed to one or more of the cameras, with the cameras located at different locations across said path, wherein the cameras are co-ordinated to read as a single camera.

2. The assembly of claim 1, wherein said housing is elongated, with said housing including at least three of said cameras mounted therein, with the cameras arranged in a linear manner.

3. The assembly of claim 1, wherein said assembly includes a film storage device that receives the film and directs the film along said path.

4. In combination, a packaging machine to receive the film and the assembly of claim 1, wherein the film passing along said path from said film storage device to said packaging machine with the scanner housing located between the film storage device and the packaging machine.

5. The assembly of claim 2, wherein said assembly includes a film storage device that receives the film and directs the film along said path.

6. In combination, a packaging machine to receive the film and the assembly of claim 2, wherein the film passing along said path from said film storage device to said packaging machine with the scanner housing located between the film storage device and the packaging machine.

7. An assembly to deliver packaging film, having a barcode, to a packaging machine, the assembly including:
    a film delivery device to pass the film along a predetermined path;
    a scanner housing fixed relative to the device and exposed to said path, the housing extending transverse relative to said path; and
    a plurality of cameras mounted in the housing and directed at said path, each camera having a charged coupling device to provide a signal indicative of a barcode exposed to one or more of the cameras, with the cameras located at different locations across said path;
    wherein said housing is elongated, with said housing including at least three of said cameras mounted therein, with the cameras arranged in a linear manner.

8. The assembly of claim 7, wherein said assembly includes a film storage device that receives the film and directs the film along said path.

9. In combination, a packaging machine to receive to film and the assembly of claim 7, wherein the film passing along said path from said film storage device to said packaging machine with the scanner housing located between the film storage device and the packaging machine.

\* \* \* \* \*